(12) United States Patent
Fujino et al.

(10) Patent No.: US 8,431,271 B2
(45) Date of Patent: Apr. 30, 2013

(54) POSITIVE ACTIVE MATERIAL FOR LITHIUM SECONDARY BATTERY AND LITHIUM SECONDARY BATTERY

(75) Inventors: Yukiko Fujino, Kyoto (JP); Yoshinobu Yasunaga, Kyoto (JP); Akihiro Fujii, Kyoto (JP); Yohei Shibata, Kyoto (JP); Mariko Kohmoto, Kyoto (JP); Takashi Egawa, Kyoto (JP); Toru Tabuchi, Kyoto (JP); Hiroe Nakagawa, Kyoto (JP); Tokuo Inamasu, Kyoto (JP); Toshiyuki Nukuda, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 322 days.

(21) Appl. No.: 12/736,901

(22) PCT Filed: May 22, 2009

(86) PCT No.: PCT/JP2009/059403
§ 371 (c)(1),
(2), (4) Date: Nov. 19, 2010

(87) PCT Pub. No.: WO2009/142283
PCT Pub. Date: Nov. 26, 2009

(65) Prior Publication Data
US 2011/0068293 A1   Mar. 24, 2011

(30) Foreign Application Priority Data

May 22, 2008   (JP) ................. 2008-133914
May 30, 2008   (JP) ................. 2008-143252
Jun. 19, 2008   (JP) ................. 2008-160075
Jun. 19, 2008   (JP) ................. 2008-160076

(51) Int. Cl.
*H01M 4/58* (2010.01)
*H01M 4/52* (2010.01)
*H01M 4/24* (2006.01)
*C09K 3/00* (2006.01)

(52) U.S. Cl.
USPC .................. 429/221; 429/231.95; 429/218.1; 252/182.1; 423/306

(58) Field of Classification Search ............... 429/218.1, 429/221, 231.95; 252/182.1; 423/306
See application file for complete search history.

(56) References Cited

U.S. PATENT DOCUMENTS 6,720,113 B2 * 4/2004 Goto et al. ............... 429/231.95
6,749,967 B2 * 6/2004 Li et al. .................... 429/231.95

(Continued)

FOREIGN PATENT DOCUMENTS

CN     1684290 A    10/2005
CN     1837033 A    9/2006

(Continued)

OTHER PUBLICATIONS

Shanmukaraj et al. Materials Science and Engineering B, 2008, vol. 149, p. 93.*

(Continued)

*Primary Examiner* — Joseph D Anthony
(74) *Attorney, Agent, or Firm* — Rader, Fishman & Grauer PLLC

(57) ABSTRACT

The invention provides a polyanion-based positive active material which can improve storage stability (especially, high temperature storage stability), charge and discharge cycle performance and the like of a lithium secondary battery, and a lithium secondary battery using the same. The positive active material for a lithium ion secondary battery contains lithium iron cobalt phosphate represented by the general formula: $Li_yFe_{(1-x)}Co_xPO_4$ ($0<x\leq0.019$, $0\leq y\leq1.2$). By using the positive active material for a lithium secondary battery, high temperature storage stability and charge and discharge cycle performance can be improved in comparison with a case where $Li_yFePO_4$ containing no Co is used. By using the positive active material, a lithium ion secondary battery can be suitable for applications in fields of electric automobiles and industrial batteries in which long lives, high capacities, and high output powers are required.

4 Claims, 2 Drawing Sheets

U.S. PATENT DOCUMENTS

| | | | |
|---|---|---|---|
| 7,422,823 B2* | 9/2008 | Saidi et al. | 429/231.9 |
| 8,022,009 B2* | 9/2011 | Huang et al. | 502/180 |
| 2003/0190528 A1* | 10/2003 | Saidi et al. | 429/231.9 |
| 2005/0064282 A1* | 3/2005 | Inagaki et al. | 429/163 |
| 2008/0241687 A1* | 10/2008 | Ishii et al. | 429/218.1 |
| 2009/0186276 A1* | 7/2009 | Zhamu et al. | 429/221 |

FOREIGN PATENT DOCUMENTS

| | | |
|---|---|---|
| JP | 09-134724 A | 5/1997 |
| JP | 2001-085010 A | 3/2001 |
| JP | 2007-317534 A | 12/2007 |
| JP | 2007-317538 A | 12/2007 |
| JP | 2007-317539 A | 12/2007 |
| JP | 2008-034218 A | 2/2008 |

OTHER PUBLICATIONS

N. Penazzi et al. Journal of the European Ceramic Society, 2004, vol. 24, p. 1381.*

D. Wang et al. Electrochimica Acta 2005, vol. 50, p. 2955.*

L. F. Nazar et al. Nature Materials, Mar. 2004, vol. 3, No. 3, p. 147-152.*

International Search Report mailed on Aug. 25, 2009.

Extended European Search Report issued in EP Application No. 09750645.5, dated Feb. 7, 2013.

Wang D. et al.: "Continuous solid solutions LiFe1-xCoxPO4 and its electrochemical performance", Journal of Power Sources, Elsevier SA, CH, vol. 146, No. 1-2, pp. 580-583, XP027756492, ISSN: 03787753, Aug. 26, 2005.

Chung-Yan Lai et al. "Effect of Co doping on structure and electrochemical performance of LiFePO4", Battery Bimonthly, vol. 37, No. 5, pp. 342-344, XP055050317, ISSN: 1001-1579, Oct. 1, 2007.

Shanmukaraj et al., "Electrochemical studies on LiFe1-xCoxPO4/ carbon composite cathode materials synthesized by citrate gel technique for lithium-ion batteries", Materials Science and Engineering B, Elsevier Sequoia, Lausanne, CH, pp. 93-98, XP022513912, ISSN: 0921-5107, Jan. 24, 2008.

Office Action issued in Chinese Patent Application No. 200910118607.7, dated Jan. 29, 2013.

* cited by examiner

POSITIVE ACTIVE MATERIAL FOR LITHIUM SECONDARY BATTERY AND LITHIUM SECONDARY BATTERY

TECHNICAL FIELD

The invention relates to a positive active material for a lithium secondary battery, particularly a polyanion-based positive active material, and a lithium secondary battery using the same.

BACKGROUND ART

In recent years, lithium secondary batteries typified by a lithium secondary battery having high energy density and good cycle performance and scarce self-discharge have drawn attention as power sources for portable equipments such as mobile phones, notebook personal computers, etc. and electric automobiles.

Lithium secondary batteries presently in the main stream are those with 2 Ah or lower in compact sizes for consumer uses, mainly for mobile phones. As a positive active material for a lithium secondary battery, many of positive active materials have been proposed and most commonly known materials are lithium-containing transition metal oxides operating voltage around 4 V containing, as a basic configuration, such as a lithium cobalt oxide ($LiCoO_2$) with an, a lithium nickel oxide ($LiNiO_2$), or a lithium manganese oxide ($LiMn_2O_4$) having a spinel structure. Especially, since the lithium cobalt oxide has excellent charge and discharge performance and energy density, it has been employed widely as a positive active material for a lithium secondary battery with a capacity as low as 2 Ah battery capacity.

However, in the case of consideration of developing non-aqueous electrolyte batteries for industrial uses, which are highly expected to become in a middle to large scale, particularly a strong demand in the future, the safety would be considered to be very important and it can be said that the present specification of compact batteries is not necessarily sufficient. One of the reasons is thermal instability of positive active materials and various countermeasures have been taken; however they have not been yet sufficient. Further, it needs to be assumed that, in industrial uses, batteries would be used in high temperature environments in which the batteries in compact sizes for consumer uses would not be used. In such high temperature environments, not only conventional lithium secondary batteries but also nickel-cadmium batteries and lead-acid batteries have also very short lives and presently, there are no batteries that satisfy the requests of users among conventional ones. Capacitors are merely those which can be used in the temperature range; however, the capacitors have small energy density and in this point, they fail to satisfy the requests of users and accordingly, batteries with a long life in a high temperature and high energy density have been desired.

Recently, a polyanion-based active material excellent in heat stability has drawn attention. Since oxygen in the polyanion-based active material is fixed by covalent bonding with an element other than transition metals, the polyanion-based active material emits no oxygen even at a high temperature and it is considered that the safety of a battery can be remarkably improved by being used as an active material.

Investigations of lithium iron phosphate ($LiFePO_4$) having an olivine structure as such a polyanion-based positive active material have been actively carried out. Since having a theoretical capacity as high as 170 mAh/g and being capable of inserting and extracting lithium at high potential 3.4 V (vs. $Li/Li^+$), lithium iron phosphate has energy density as high as that of $LiCoO_2$ and has been expected large as a positive active material for replacing $LiCoO_2$.

Some trials for synthesis of partially substituted lithium iron phosphate by cobalt for iron have been reported.

Patent Document 1 describes synthesis of $LiCo_{0.25}Fe_{0.75}PO_4$, $LiCo_{0.5}Fe_{0.5}PO_4$, $LiCo_{0.75}Fe_{0.25}PO_4$, and $LiCoPO_4$, which are equivalent to the amounts of substituted by Co of 25%, 50%, 75%, and 100%, by a solid-phase method, production of nonaqueous electrolyte secondary batteries by using these compounds as positive active materials and lithium metal as a negative electrode; and results of evaluation of discharge capacities after charging to 5.3 V and discloses that "those with a higher cobalt content show a higher discharge voltage and a voltage exceeding 4.5 V in the plateau part of the discharge voltage" (in paragraph 0022) and that the discharge capacity along with Co amount is increased or decreased in accordance with a discharge end voltage (Table 1).

Non-patent Document 1 describes synthesis of $LiFe_{0.8}Co_{0.2}PO_4$, $LiFe_{0.5}Co_{0.5}PO_4$, and $LiFe_{0.2}Co_{0.8}PO_4$, which are equivalent to the amounts of substitution by Co of 20%, 50%, and 80%, by a solid-phase method, production of single electrode evaluation cells by using these compounds as positive active materials, and results of charge and discharge cycle tests at a charging potential of 5 V and results of charge and discharge cycle tests at a charging potential of 4V using $LiFePO_4$ as a positive active material and discloses that in the case of 20% with substitution by Co, the initial discharge capacity is slightly increased as compared with that in the case of using $LiFePO_4$; however the capacity retention ratio along with the charge and discharge cycle is worsened as compared with that in the case of using $LiFePO_4$; and that in the case of 50% and 80% with substitution by Co, the initial discharge capacity and also the capacity retention ratio along with the charge and discharge cycle are both considerably worsened as compared with those in the case of using $LiFePO_4$ (FIG. 2).

Non-patent Document 1 describes synthesis of $LiFe_{0.9}Co_{0.1}PO_4$, which is equivalent to the amount of substitution by Co of 10%, by a solid-phase method, production of nonaqueous electrolyte secondary batteries by using the compound as a positive active material and lithium metal as a negative electrode, and results of comparison of the discharge end capacity at 2.0 V after charging to 4.5 V with that of $LiFePO_4$ and discloses that in high rate discharge performance at 5 C discharge is improved; however the discharge capacity at 0.2 C discharge is lowered (see FIG. 3).

Non-patent Document 3 describes synthesis of $LiFe_{1-x}Co_xPO_4$ (x=0.02, 0.04, 0.08, and 0.1), which are equivalent to the amounts of substitution by Co of 2%, 4%, 8% and 10%, production of nonaqueous electrolyte secondary batteries by using these compounds as positive active material and metals lithium for a negative electrode, conduct of an initial discharge test and a charge and discharge cycle test at a charging voltage of 5.1 V, and results of comparison with those in the case of using $LiFePO_4$ at a charging voltage of 4.25 V and discloses in FIG. 7 that in all of batteries using the compounds substituted by Co, the discharge capacity is decreased as compared with that in the case of using $LiFePO_4$ and discloses in Abstract that substitution by Co causes an adverse effect on the electrochemical performance of lithium iron phosphate. Further, it is also disclosed that a charge and discharge cycle test is carried out at 1 C discharge ratio (equivalent to 1 It), and as a result, no more than about 50% of capacity is obtained (FIG. 8).

In Non-patent Document 3, the above-mentioned various positive active materials are synthesized by dissolving $LiOH \cdot H_2O$ and $FeC_2O_4 \cdot 2H_2O$ in nitric acid, dropwise adding a $(NH_4)H_2PO_4$ solution together with citric acid to the obtained solution, heating the mixture at 75° C., and drying the obtained gel at 110° C. to obtain precursors which are then calcined at 750° C. for 10 hours in Ar atmosphere and successively at 850° C. for 2 hours. There is a description that regardless of presence or absence of substitution by Co, existence of a small amount of $Fe_2P$ impurity phase is confirmed in all of the synthesized samples by X-ray diffraction patterns. Regarding this point, Non-patent Document 4 demonstrates that the improvement of electron conductivity is not attributed to doping with a small amount of different elements but existence of a phosphide phase such as phase separated $Fe_2P$ formed by mixing such different elements and carrying out the synthesis contributes to the improvement of electron conductivity from the results of measurements by a transmission electron microscope (TEM) and an electron energy-loss spectroscopy (EELS) in combination.

It is known that the redox reaction generated alone with electrochemical insertion and extraction of lithium in and from $LiFePO_4$ proceeds at a relatively low potential around 3.4 V (vs. $Li/Li^+$) and on the other hand, the reaction proceeds at a relatively high potential around 4.8 V (vs. $Li/Li^+$) in the case of $LiCoPO_4$. In general, partially substituted $LiFePO_4$ by Co for Fe aims to give high energy density as a positive active material by utilizing high redox potential of $LiCoPO_4$. Therefore, in the conventional technical documents described above, the battery performance is evaluated by employing potentials sufficiently high for changing the valence of Co by charging.

However, in lithium secondary batteries aiming for actual industrial uses, designing needs to be carried out in consideration of oxidation resistance issue of a nonaqueous electrolyte solution and therefore, charging at a positive electrode potential exceeding 4.2 V causes a problem in terms of battery performance.

Accordingly, as a prior condition of the invention aiming for industrial uses, various kinds of issues need to be solved on condition that the positive electrode potential does not reach over 4.2 V at the time of charging while the characteristic which $LiFePO_4$ intrinsically has such that the insertion and extraction reaction of lithium proceeds at a relatively low potential is utilized. Herein, it can be said that the invention relates to a lithium secondary battery to be used in a range where a positive electrode potential does not exceed 4.2 V. In examples described below, the positive electrode potential is made to reach 3.8 V or 3.6 V at the time of charging, excluding the charge and discharge test, high rate discharge test, and charge and discharge cycle test in Examples 5 to 8 and Comparative Examples 6 to 10.

In consideration of the fact that the redox potential of $LiCoPO_4$ is around 4.8V (vs. $Li/Li^+$) while putting aside the fact that many documents report partial substitution by Co for Fe of $LiFePO_4$ lowers the discharge capacity, even if a phenomenon such that the energy density and the like increase by the partial substitution by Co for Fe of $LiFePO_4$ occurs on condition that charging is carried out to a potential as sufficiently high as, for example, 5 V, the phenomenon is not necessarily unrealizable. However, on condition that the positive electrode potential does not reach over 4.2 V at the time of charging, since the valence of Co cannot be changed and therefore, making Co exist in $LiFePO_4$ is expected to result in merely deterioration of the battery performance such as reversible discharge capacity.

Further, any of the patent document and non-patent documents does not describe how the high temperature storage stability of a battery using partially substituted by Co for Fe of $LiFePO_4$ for the positive active material would be.

Further, Patent Document 1 describes that "those usable as a negative active material, besides lithium, are a lithium alloy, a lithium compound as well as conventionally known alkali metals and alkaline earth metals such as sodium, potassium and magnesium, and substances which can absorb and desorb alkali metal and alkaline earth metal ions such as alloys of these metals and carbon materials (paragraph 0005) and also describes with respect to carbon materials to be used as the negative active material in one line. However, any of the patent document and non-patent documents neither describes batteries using partially substituted by Co for Fe of $LiFePO_4$ for the positive active material and a carbon material for the negative electrode nor describes nor indicates how the battery performance (remaining capacity ratio and recovery capacity ratio) and the charge and discharge cycle performance would be after storage of a battery using partially substituted by Co for Fe of $LiFePO_4$ for the positive active material and a carbon material for the negative electrode.

Further, the description how the remaining capacity ratio and the recovery capacity ratio would be in the case of using a carbon material capable of insertion and extraction a lithium ion for the negative electrode is not at all expected from the patent document and non-patent documents which only describe batteries using lithium metal for the negative electrode. It is because in the case of using the carbon material for the negative electrode, the remaining capacity ratio and the recovery capacity ratio are evaluation of the ratio of Li to be returned from the carbon material of the negative electrode at the time of discharge after a portion of Li which exists in the positive active material reaches the carbon material of the negative electrode by charging and successively the battery is stored.

Furthermore, the description how the charge and discharge performance would be in the case of using a carbon material capable of insertion and extraction a lithium ion for the negative electrode is not at all expected from the patent document and non-patent documents which only describe batteries using lithium metal for the negative electrode. It is because in the case of using lithium metal for the negative electrode, the negative electrode generally has excess capacity and the batteries become those having capacity balance limited in the positive electrode whereas in the case of using the carbon material for the negative electrode, the lithium source is all supplied from the positive electrode side and the capacity balance is generally limited in the negative electrode and accordingly, the charge and discharge cycle performance would be largely affected by the performance of the negative electrode.

PRIOR ART DOCUMENT

Patent Document

Patent Document 1: Japanese Patent No. 3523397
Non-Patent Document
Non-patent Document 1: N. Penazzi et al. Journal of the European Ceramic Society, 2004, vol. 24, page 1381.
Non-patent Document 2: D. Wang et al. Electrochimica Acta 2005, vol. 50, page 2955.
Non-patent Document 3: Shanmukaraj et al. Materials Science and Engineering B, 2008, vol. 149, page 93.

Non-patent Document 4: L. F. Nazar et al. Nature Materials, MARCH 2004, VOL. 3, no. 3, page 147-152.

SUMMARY OF THE INVENTION

Problems to be Solved by the Invention

In view of the above problems, it is an object of the invention to provide a polyanion-based positive active material which can improve such as storage stability (especially high temperature storage stability) and cycle (charge and discharge cycle) performance of a lithium secondary battery and a lithium secondary battery using the same.

Means for Solving the Problems

The configuration and the effect of the invention are as follows. The action mechanisms described in this specification include estimation and the invention is not at all limited by its right and wrong.

The invention provides a positive active material for a lithium secondary battery containing lithium iron cobalt phosphate represented by the following general formula: $Li_yFe_{(1-x)}Co_xPO_4$ ($0<x\leq0.019$, $0\leq y\leq1.2$). The reference character x preferably satisfies $0.005\leq x\leq 0.019$.

Further, the invention provides a lithium secondary battery having a positive electrode containing the positive active material, a negative electrode, and a nonaqueous electrolyte. The negative electrode preferably contains a carbon material capable of insertion and extraction a lithium ion.

The positive active material of the invention can be represented by the general formula: $Li_yFe_{(1-x)}Co_xPO_4$ ($0<x\leq0.019$, $0\leq y\leq1.2$) and it may include materials represented by the general formula in which a portion of Fe or Li is substituted by transition metal elements such as Mn and Ni, excluding Fe and Co as well as metal elements such as Al, excluding Li, Fe, and Co. Further, the polyanion portion ($PO_4$) may partially form a solid solution with ($SiO_4$) and these materials are also included in the scope of the invention.

A method for producing the positive active material of the invention is not particularly limited; however basically, the positive active material can be obtained by preparing raw materials including a raw material containing metal elements (Li, Fe, and Co) constituting an active material and a raw material to be a phosphoric acid source in accordance with the composition of the intended active material and calcining the raw materials. In this case, the composition of the compound to be obtained actually may be possibly slightly changed from the composition calculated from the composition ratios of loaded raw materials in some cases. It is no need to say that the invention can be carried out without departing from the technical ideas or main characteristics thereof, the composition obtained in the production should not be construed as being not belonging to the invention by the fact that the composition is not strictly conformed to the above-mentioned composition formula. Particularly, with respect to a lithium source, it is known that a portion of the lithium source tends to be evaporated during calcination. Therefore, it is common to load a larger amount of the lithium source than the equimolecular amount to that of Fe as a raw material before calcining.

In order to exert the effect of the invention by the lithium iron cobalt phosphate represented by the general formula: $Li_yFe_{(1-x)}Co_xPO_4$ ($0<x\leq0.019$, $0\leq y\leq1.2$), it is required that Co forms a solid solution in the $LiFePO_4$ structure and it is supposed that in a case where $LiFePO_4$ and $LiCoPO_4$ are simply mixed, the effect of the invention is not exerted. In the case of a simple mixture, since the peak positions corresponding to the respective lattice constants in an X-ray diffraction pattern are different from one another, one peak is branched to two or three, whereas in the case of a solid solution, one peak is not theoretically branched. However, the positive active material of the invention may contain a Co compound as an impurity which does not form a solid solution in the olivine structure and the positive electrode may be used while being mixed with another active material such as $LiCoO_2$ beside the positive active material of the invention and such an aspect is also considered to be within the scope of the invention.

Further, in examples described below, a positive active material represented by the general formula: $Li_yFe_{(1-x)}Co_xPO_4$ in which y=1 is proposed and since as described above, the Li composition especially tends to be easily fluctuated in the synthesis process of the active material and in addition, the positive active material in a battery may have a range of Li up to 0 by charging and also up to 1.2 by discharge due to Li insertion and therefore, y is defined as $0\leq y\leq1.2$.

Effects of the Invention

The invention provides a polyanion-based positive active material which can improve the high temperature storage stability (capacity retention ratio), the battery performances after storage (remaining capacity ratio and recovery capacity ratio), and the cycle performance of a lithium secondary battery and a lithium secondary battery using the same.

MODE FOR CARRYING OUT THE INVENTION

Figure 1:
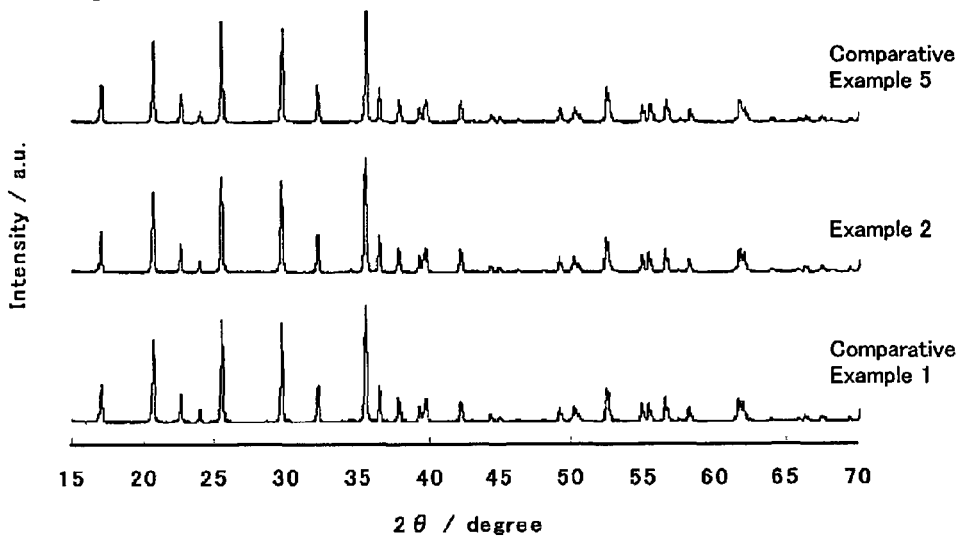
FIG. 1: X-ray diffraction patterns of positive active materials for the lithium secondary batteries of examples and comparative examples.

A synthesis method for the polyanion-based positive active material of the invention is not particularly limited. Specific examples thereof include a solid-phase method, a liquid-phase method, a sol-gel method, a hydrothermal method, etc. Herein, the polyanion-based positive active material can be obtained finally by calcination. In order to obtain a positive active material for a lithium secondary battery excellent in high temperature storage stability, it is preferable that no $Fe_2P$ impurity phase exists in the synthetic material after calcination. It is confirmed by the present inventors that if the positive active material contains the $Fe_2P$ impurity phase, $Fe_2P$ is dissolved in an electrolyte solution and affects particularly the negative electrode side to result in deterioration of the high temperature storage stability. In this specification, in a case where powder X-ray diffraction analysis is carried out by using CuKα radiation for the obtained active materials, in the X-ray diffraction patterns with a full scale based on the maximum peaks, "no $Fe_2P$ impurity phase is observed" means any peak derived from $Fe_2P$ around 2θ=41° is not observed clearly by eye observation.

The production conditions in which no $Fe_2P$ impurity phase is observed in the synthetic materials after calcination are not particularly limited; however, first, the fact that the respective raw materials are evenly mixed before calcining is very important. Further, it is also important that the calcination atmosphere is not to be reduction atmosphere. For example, since calcination is carried out in nitrogen atmosphere containing 5% of hydrogen, production of the $Fe_2P$ impurity phase is easily observed and therefore, it is undesirable. Moreover, the calcination temperature is preferably not to be too high and it is preferably, for example, 720° C. or lower.

In order to supplement the electron conductivity, it is preferably to deposit and to coat carbon by mechanically or thermal decomposition of an organic substance on the particle surface of the positive active material.

In the invention, the polyanion-based positive active material is used preferably in the form of a powder with an average particle size of secondary particles of 100 μm or smaller for the positive electrode of a lithium secondary battery. Particularly, smaller particle size is preferable and the average particle size of the secondary particles is more preferably 0.5 to 20 μm and the particle size of the primary particles constituting the secondary particles is preferably 1 to 500 nm. Further, the specific surface area of the powder particles is favorable to be higher in order to improve the high rate discharge performance of the positive electrode and it is preferably 1 to 100 $m^2/g$ and more preferably 5 to 100 $m^2/g$. In order to obtain a powder in a specified shape, a pulverizer or a classification apparatus may be used. Examples thereof include a mortar, a ball mill, a sand mill, a vibration ball mill, a planet ball mill, a jet mill, a counter jet mill, a swirling current type jet mill, and a sieve. At the time of pulverization, wet type pulverization using water or an organic solvent such as an alcohol, hexane, or the like at the same time may be employed. A classification method is not particularly limited and based on the necessity, a sieve or an air blow classification apparatus may be used in a dry system or a wet system.

As a conductive agent and a binder, conventionally known agents may be used in a conventionally known technique.

The water content contained in a positive electrode containing the positive active material of the invention is more preferable if it is less and specifically, it is preferably less than 500 ppm.

The thickness of an electrode mixture layer to be employed in the invention is preferably 20 to 500 μm in relation to the energy density of a battery.

The negative electrode of the battery of the invention is not particularly limited and includes, besides a lithium metal and a lithium alloy (lithium metal-containing alloys such as lithium-aluminum, lithium-lead, lithium-tin, lithium-aluminum-tin, lithium-gallium and Wood's alloys), an alloy and carbon material (e.g. graphite, hard carbon, low temperature-calcined carbon and amorphous carbon), metal oxide, lithium metal oxide (e.g. $Li_4Ti_5O_{12}$), and polyphosphoric acid compound capable of adsorbing and desorbing lithium. Among them, having an operation potential extremely close to that of lithium metal and realizing charge and discharge at a high operation voltage, graphite is especially preferable as a negative electrode material. Examples thereof include artificial graphite and natural graphite. Particularly, graphite obtained by modifying the surfaces of negative active material particles with amorphous carbon or the like is preferable since scarcely emitting gas during charging.

The embodiment of an nonaqueous electrolyte battery is configured by a positive electrode, a negative electrode, and a nonaqueous electrolyte containing an electrolyte salt in a nonaqueous solvent and in general, a separator is provided between the positive electrode and the negative electrode and an outer body for wrapping these components is provided.

Examples of the nonaqueous solvent include cyclic carbonate such as propylene carbonate and ethylene carbonate; cyclic esters such as γ-butyrolactone and γ-valerolactone; chain carbonates such as dimethyl carbonate, diethyl carbonate, and ethyl methyl carbonate; chain esters such as methyl formate, methyl acetate, and methyl butyrate; tetrahydrofuran and derivatives thereof ethers such as 1,3-dioxane, 1,4-dioxane, 1,2-dimethoxyethane, 1,4-dibutoxyethane, and methyl diglyme; nitriles such as acetonitrile and benzonitrile; dioxolane and derivatives thereof a single or two or more mixtures of ethylene sulfide, sulfolane, sultone and derivatives thereof however the nonaqueous solvent is not limited thereto.

Examples of the electrolyte salt include ionic compounds such as $LiBF_4$ and $LiPF_6$ and these ionic compounds may be used alone or two or more of them can be used in combination. The concentration of the electrolytic salt in the nonaqueous electrolyte is preferably 0.5 mol/l to 5 mol/l and more preferably 1 mol/l to 2.5 mol/l in order to reliably obtain a nonaqueous electrolyte battery with high battery performance.

Although a lithium secondary battery, particularly a nonaqueous electrolyte battery, will be described in detail in this specification; however the positive active material of the invention efficiently exerts the effect of the invention even in the case of being used for the positive electrode of an aqueous solution type lithium secondary battery.

EXAMPLES

Hereinafter, the invention will be described more in detail with reference to examples, however, it is not intended that the invention be limited to the following embodiments.

Example 1

(Synthesis of $LiFe_{0.995}Co_{0.005}PO_4$)

Iron oxalate dihydrate ($FeC_2O_4 \cdot 2H_2O$), cobalt acetate tetrahydrate ($Co(CH_3COO)_2 \cdot 4H_2O$), ammonium dihydrogen phosphate ($NH_4H_2PO_4$), and lithium carbonate ($Li_2CO_3$) were weighed at a molar ratio of 0.995:0.005:1:0.51. Ethanol was added thereto to obtain a paste-like mixture and the mixing was carried out in a wet manner for 2 hours by using a ball mill (a planetary mill manufactured by Fritsch GmbH, ball size of 1 cm).

The mixture was put in a crucible made of alumina (external dimension 90×90×50 mm) and calcined in nitrogen gas circulation condition (flow rate of 1.0 l/min) by using an gas convertible calcining furnace (Gas Convertible High-accuracy Vacuum Furnace KDF-75, manufactured by Denken Co., Ltd). The calcining temperature was 700° C. and the calcining time (time for keeping calcining temperature) was 2 hours. The temperature increasing speed was 5° C./min and the temperature decrease was carried out by spontaneous cooling. The obtained product was confirmed to have a composition of $LiFe_{0.995}Co_{0.005}PO_4$ by ICP emission spectroscopy. In such a manner, a positive active material for a lithium secondary battery was produced.

Example 2

(Synthesis of $LiFe_{0.99}Co_{0.01}PO_4$)

In production of the positive active material, a positive active material for a lithium secondary battery was produced in the same manner as in Example 1, except that iron oxalate dihydrate ($FeC_2O_4 \cdot 2H_2O$), cobalt acetate tetrahydrate ($Co(CH_3COO)_2 \cdot 4H_2O$), ammonium dihydrogen phosphate ($NH_4H_2PO_4$), and lithium carbonate ($Li_2CO_3$) were weighed at a molar ratio of 0.99:0.01:1:0.51. A composition of $LiFe_{0.99}Co_{0.01}PO_4$ was confirmed by ICP emission spectroscopy.

Example 3

(Synthesis of $LiFe_{0.985}Co_{0.015}PO_4$)

In production of the positive active material, a positive active material for a lithium secondary battery was produced in the same manner as in Example 1, except that iron oxalate dihydrate ($FeC_2O_4 \cdot 2H_2O$), cobalt acetate tetrahydrate ($Co(CH_3COO)_2 \cdot 4H_2O$), ammonium dihydrogen phosphate ($NH_4H_2PO_4$), and lithium carbonate ($Li_2CO_3$) were weighed at a molar ratio of 0.985:0.015:1:0.51. A composition of $LiFe_{0.985}Co_{0.015}PO_4$ was confirmed by ICP emission spectroscopy.

Example 4

(Synthesis of $LiFe_{0.981}Co_{0.019}PO_4$)

In production of the positive active material, a positive active material for a lithium secondary battery was produced in the same manner as in Example 1, except that iron oxalate dihydrate ($FeC_2O_4 \cdot 2H_2O$), cobalt acetate tetrahydrate ($Co(CH_3COO)_2 \cdot 4H_2O$), ammonium dihydrogen phosphate ($NH_4H_2PO_4$), and lithium carbonate ($Li_2CO_3$) were weighed at a molar ratio of 0.981:0.019:1:0.51. A composition of $LiFe_{0.981}Co_{0.019}PO_4$ was confirmed by ICP emission spectroscopy.

Comparative Example 1

(Synthesis of $LiFePO_4$)

In production of the positive active material, $LiFePO_4$ was obtained in the same manner as in Example 1, except that iron oxalate dihydrate ($FeC_2O_4 \cdot 2H_2O$), ammonium dihydrogen phosphate ($NH_4H_2PO_4$), and lithium carbonate ($Li_2CO_3$) were weighed at a molar ratio of 1:1:0.51.

Comparative Example 2

(Synthesis of $LiFe_{0.98}Co_{0.02}PO_4$)

In production of the positive active material, a positive active material for a lithium secondary battery was produced in the same manner as in Example 1, except that iron oxalate dihydrate ($FeC_2O_4 \cdot 2H_2O$), cobalt acetate tetrahydrate ($Co(CH_3COO)_2 \cdot 4H_2O$), ammonium dihydrogen phosphate ($NH_4H_2PO_4$), and lithium carbonate ($Li_2CO_3$) were weighed at a molar ratio of 0.98:0.02:1:0.51. A composition of $LiFe_{0.98}Co_{0.02}PO_4$ was confirmed by ICP emission spectroscopy.

Comparative Example 3

(Synthesis of $LiFe_{0.97}Co_{0.03}PO_4$)

In production of the positive active material, a positive active material for a lithium secondary battery was produced in the same manner as in Example 1, except that iron oxalate dihydrate ($FeC_2O_4 \cdot 2H_2O$), cobalt acetate tetrahydrate ($Co(CH_3COO)_2 \cdot 4H_2O$), ammonium dihydrogen phosphate ($NH_4H_2PO_4$), and lithium carbonate ($Li_2CO_3$) were weighed at a molar ratio of 0.97:0.03:1:0.51. A composition of $LiFe_{0.97}Co_{0.03}PO_4$ was confirmed by ICP emission spectroscopy.

Comparative Example 4

(Synthesis of $LiFe_{0.95}Co_{0.05}PO_4$)

In production of the positive active material, a positive active material for a lithium secondary battery was produced in the same manner as in Example 1, except that iron oxalate dihydrate ($FeC_2O_4 \cdot 2H_2O$), cobalt acetate tetrahydrate ($Co(CH_3COO)_2 \cdot 4H_2O$), ammonium dihydrogen phosphate ($NH_4H_2PO_4$), and lithium carbonate ($Li_2CO_3$) were weighed at a molar ratio of 0.95:0.05:1:0.51. A composition of $LiFe_{0.95}Co_{0.05}PO_4$ was confirmed by ICP emission spectroscopy.

Comparative Example 5

(Synthesis of $LiFe_{0.90}Co_{0.10}PO_4$)

In production of the positive active material, a positive active material for a lithium secondary battery was produced in the same manner as in Example 1, except that iron oxalate dihydrate ($FeC_2O_4 \cdot 2H_2O$), cobalt acetate tetrahydrate ($Co(CH_3COO)_2 \cdot 4H_2O$), ammonium dihydrogen phosphate ($NH_4H_2PO_4$), and lithium carbonate ($Li_2CO_3$) were weighed at a molar ratio of 0.90:0.10:1:0.51. A composition of $LiFe_{0.90}Co_{0.10}PO_4$ was confirmed by ICP emission spectroscopy.

The positive active materials for a lithium secondary battery produced in all of examples and comparative examples were conducted to powder X-ray diffraction measurement (XRD) using CuKα radiation to find the formation of a single phase and no peak corresponding to $Fe_2P$ impurity phase around 41° and therefore, existence of the $Fe_2P$ impurity phase as described in Non-patent Document 3 was not confirmed. The X-ray diffraction patterns of some of examples and comparative examples are shown in FIG. 1. The BET specific surface area was all about 1 $m^2/g$.

With respect to the positive active material, the positive active materials of Examples 1 to 4 and Comparative Examples 1 to 5 were used and lithium secondary batteries were assembled in the following procedure and batteries performances were evaluated by the following high temperature storage test. At this time, in order to precisely comprehend the performance change of the lithium iron cobalt phosphate compound itself by eliminating factors possible to affect the battery performance as much as possible, carbon coating on the positive active material particles was not intentionally carried out.

(Production of Positive Electrode)

A positive electrode paste containing each of the positive active materials, acetylene black as a conductive agent, and poly(vinylidene fluoride) (PVdF) as a binder at a weight ratio of 80:8:12 and N-methyl-2-pyrrolidone (NMP) as a solvent was produced. The positive electrode paste was applied to both faces of an aluminum mesh current collector to which an aluminum terminal is attached and after the NMP was removed at 80° C., the current collector was folded in such a manner that the applied parts were layered double and the projected area of the applied parts became a half and then pressed so as to adjust the entire thickness after the folding to 400 μm and thus each positive electrode was obtained. The positive electrode was vacuum dried at 150° C. for 5 hours or longer to remove water from the obtained electrode plate.

(Production of Negative Electrode)

A lithium metal foil with a thickness of 300 μm was stuck to both faces of an SUS 316 mesh current collector to which an SUS 316 terminal was attached and the current collector was pressed to obtain a negative electrode.

(Production of Reference Electrode)

An electrode obtained by sticking a lithium metal foil with a thickness of 300 μm to an SUS 316 current collector rod was employed as a reference electrode.

(Preparation of Electrolyte Solution)

A nonaqueous electrolyte was produced by dissolving a fluorine-containing electrolyte salt, $LiPF_6$, in a concentration of 1.2 mol/L in a mixed solvent obtained by mixing ethylene carbonate and diethyl carbonate at a volume ratio of 3:7. The water content in the nonaqueous electrolyte was adjusted to less than 50 ppm.

(Assembly of Battery)

Each nonaqueous electrolyte battery made of glass was assembled in an Ar box with a dew point of −40° C. or lower. After one sheet of a positive electrode, a negative electrode, and a reference electrode, respectively, was clipped by gold-plated clips in which a conductive wire part was previously fixed in the cover part of a container, the positive and negative electrodes were fixed so as to be opposite to each other. The reference electrode was fixed at a position in the rear side of the positive electrode when observed from the negative electrode. Next, a cap made of polypropylene and containing a prescribed amount of the electrolyte solution was arranged in the glass container and the cover was placed in such a manner that the positive electrode, the negative electrode and the reference electrode were immersed to assemble each battery.

(High Temperature Storage Test)

First, Each of the Lithium Secondary Batteries was Conducted to charge and discharge process of carrying out two cycles of charge and discharge at a temperature of 25° C. The charging condition was constant current and constant voltage charging at a current of 0.1 ItmA (about 10 hour ratio) and a voltage of 3.8 V for 15 hours and the discharging condition was constant current discharging at a current of 0.1 ItmA (about 10 hour ratio) and a final voltage of 2.0 V. In this case, the discharge capacity obtained in the second cycle was recorded as "discharge capacity before high temperature storage (mAh)".

Next, at a temperature of 25° C., only the positive electrode was taken out in the Ar box at a dew point of −40° C. or lower after one cycled charge was carried out in the same condition as that of the charge and discharge process and the positive electrode and 1 ml of the electrolyte solution were sealed in a bag made of an aluminum laminate and stored in a thermostat bath at 45° C. for 20 days.

After being taken out of the thermostat bath and cooled to a temperature of 25° C. by air cooling in the Ar box at a dew point of −40° C. or lower, the bag was opened and a lithium secondary battery was assembled again in the same procedure in order to evaluate the extent of the self discharge due to the high temperature storage and the remaining discharge capacity was confirmed at a temperature of 25° C. The discharge condition was constant current discharging at a current of 0.1 ItmA (about 10 hour ratio) and a final voltage of 2.0 V. This discharge capacity was recorded as "discharge capacity after high temperature storage (mAh)" and the percentage of the "discharge capacity after high temperature storage (mAh)" to the "discharge capacity before high temperature storage (mAh)" was defined as "capacity retention ratio (%)" (high temperature storage stability). The results are shown in Table 1.

TABLE 1

| | Positive active material composition | Capacity retention ratio % |
|---|---|---|
| Comparative Example 1 | $LiFePO_4$ | 84.7 |
| Example 1 | $LiFe_{0.995}Co_{0.005}PO_4$ | 87.7 |
| Example 2 | $LiFe_{0.99}Co_{0.01}PO_4$ | 87.9 |
| Example 3 | $LiFe_{0.985}Co_{0.015}PO_4$ | 87.8 |
| Example 4 | $LiFe_{0.981}Co_{0.019}PO_4$ | 87.2 |
| Comparative Example 2 | $LiFe_{0.98}Co_{0.02}PO_4$ | 86.5 |
| Comparative Example 3 | $LiFe_{0.97}Co_{0.03}PO_4$ | 86.0 |
| Comparative Example 4 | $LiFe_{0.95}Co_{0.05}PO_4$ | 85.2 |
| Comparative Example 5 | $LiFe_{0.90}Co_{0.10}PO_4$ | 84.8 |

As it could be understood from Table 1, it was understood that a remarkable effect which could not be expected from the conventional techniques could be exerted such that a polyanion-based active material excellent in high temperature storage stability could be provided by adjusting the value of x in $LiFe_{(1-x)}Co_xPO_4$ to $0<x\leqq0.019$ as compared with $LiFePO_4$ of Comparative Example 1. From Table 1, the value of x is more preferably 0.015 or lower. Further, especially, the value of x is most preferably 0.005 or higher.

Although the positive active materials were used for the batteries of Examples 1 to 4 and Comparative Examples 1 to 5 without carrying out carbon coating on the positive active material particles, in production of lithium secondary batteries for industrial uses, it is preferable to carry out carbon coating on the positive active material particles. The present inventors carried out the same test for a case where carbon coating was carried out on the positive active material particles and it will be described below.

Example 5

After the positive active material ($Li_yFe_{0.995}Co_{0.005}PO_4$) obtained in Example 1 and poly(vinyl alcohol) (polymerization degree of about 1500) were weighed at a mass ratio of 1:1, the dry mixing were carried out by a ball mill and the mixture was put in a crucible made of alumina and calcined at 700° C. for 1 hour in nitrogen gas circulation condition (flow rate of 1.0 L/min) by using an atmosphere-replaceable calcining furnace to carry out carbon coating.

Example 6

Carbon coating was carried out in the same manner as in Example 5 for the positive active material ($LiFe_{0.99}Co_{0.01}PO_4$) obtained in Example 2.

Example 7

Carbon coating was carried out in the same manner as in Example 5 for the positive active material ($LiFe_{0.985}Co_{0.015}PO_4$) obtained in Example 3.

Example 8

Carbon coating was carried out in the same manner as in Example 5 for the positive active material ($LiFe_{0.981}Co_{0.019}PO_4$) obtained in Example 4.

Comparative Example 6

Carbon coating was carried out in the same manner as in Example 5 for the positive active material (LiFePO$_4$) obtained in Comparative Example 1.

Comparative Example 7

Carbon coating was carried out in the same manner as in Example 5 for the positive active material (LiFe$_{0.98}$Co$_{0.02}$PO$_4$) obtained in Comparative Example 2.

Comparative Example 8

Carbon coating was carried out in the same manner as in Example 5 for the positive active material (LiFe$_{0.97}$Co$_{0.03}$PO$_4$) obtained in Comparative Example 3.

Comparative Example 9

Carbon coating was carried out in the same manner as in Example 5 for the positive active material (LiFe$_{0.95}$Co$_{0.05}$PO$_4$) obtained in Comparative Example 4.

Comparative Example 10

Carbon coating was carried out in the same manner as in Example 5 for the positive active material (LiFe$_{0.90}$Co$_{0.10}$PO$_4$) obtained in Comparative Example 5.

The BET specific surface areas of the positive active materials were all about 6 m$^2$/g after carbon coating.

Using the positive active materials of Examples 5 to 8 and Comparative Examples 6 to 10, lithium secondary batteries were assembled in the same procedure described above in Example 1 and the batteries performances were evaluated by the following charge and discharge test, high rate discharge test, and cycle test.

(Charge and Discharge Test)

Each of the lithium secondary batteries was conducted to the charge and discharge process of carrying out two cycles of charge and discharge at a temperature of 25° C. The charging condition was constant current and constant voltage charging at a current of 0.1 ItmA (about 10 hour ratio) and a voltage of 4.9 V for 15 hours and the discharging condition was constant current discharging at a current of 0.1 ItmA (about 10 hour ratio) and a final voltage of 2.0 V. The results of the discharge capacity obtained in the first cycle are shown in Table 2.

(High Rate Discharge Test)

After charging was carried out in the same condition as that of the initial charge and discharge process, constant current discharge was carried out at a discharge current of 2.0 ItmA (about 0.5 hour ratio) and a final voltage of 2.0 V. The percentage of the discharge capacity to the discharge capacity of 0.1 ItmA in the charge and discharge process was measured and defined as "high rate discharge performance value (%)". The results are also shown in Table 2.

(Charge and Discharge Cycle Test)

Each battery conducted to the high rate discharge test was conducted to the cycle test at a temperature of 25° C. The charging condition was constant current and constant voltage charging at a current of 1.0 ItmA (about 1 hour ratio) and a voltage of 4.9 V for 1.5 hours and the discharging condition was constant current discharging at a current of 1.0 ItmA (about 1 hour ratio) and a final voltage of 2.0 V. The percentage of the discharge capacity after 50 cycles to the discharge capacity of the first cycle in this cycle test was measured and defined as "charge and discharge cycle performance (%)".

The results of the discharge capacity are also shown in Table 2.

TABLE 2

| | Positive active material composition | Discharge capacity (mAh/g) | High rate discharge performance value (%) | Charge and discharge cycle performance (%) |
|---|---|---|---|---|
| Comparative Example 6 | LiFePO$_4$ | 142.1 | 66% | 76% |
| Example 5 | LiFe$_{0.995}$Co$_{0.005}$PO$_4$ | 143.0 | 67% | 79% |
| Example 6 | LiFe$_{0.99}$Co$_{0.01}$PO$_4$ | 144.2 | 69% | 79% |
| Example 7 | LiFe$_{0.985}$Co$_{0.015}$PO$_4$ | 143.5 | 70% | 78% |
| Example 8 | LiFe$_{0.981}$Co$_{0.019}$PO$_4$ | 142.3 | 67% | 76% |
| Comparative Example 7 | LiFe$_{0.98}$Co$_{0.02}$PO$_4$ | 141.7 | 65% | 74% |
| Comparative Example 8 | LiFe$_{0.97}$Co$_{0.03}$PO$_4$ | 140.2 | 65% | 70% |
| Comparative Example 9 | LiFe$_{0.95}$Co$_{0.05}$PO$_4$ | 139.5 | 62% | 63% |
| Comparative Example 10 | LiFe$_{0.90}$Co$_{0.10}$PO$_4$ | 139.2 | 70% | 56% |

As it can be understood from Table 2, the discharge capacities were all decreased in Comparative Examples 7 to 10 in which the amounts of substitution by Co were 2%, 3%, 5%, and 10% as compared with that of Comparative Example 6 with no substitution by Co.

On the other hand, the discharge capacities were all astonishingly increased in Examples 5 to 8 in which the amounts of substitution by Co were 0.5%, 1%, 1.5%, and 1.9% as compared with that of Comparative Example 6 (LiFePO$_4$).

That is, it was understood that a remarkable effect which could not be expected from the conventional techniques could be exerted such that a polyanion-based active material having a large discharge capacity could be provided by adjusting the value of x in the general formula LiFe$_{(1-x)}$Co$_x$PO$_4$ to 0<x≦0.019, preferably the value of x 0.005 or higher and 0.019 or lower, as compared with that of LiFePO$_4$. From Table 1, it can be understood that the value of x is more preferably 0.005 or higher and 0.015 or lower and even more preferably 0.010 or higher and 0.015 or lower.

Further, as it can be understood from Table 2, it was acknowledged that the high rate discharge performances of Comparative Examples 7 to 9 in which the amounts of substitution by Co were 2%, 3%, and 5% were all lowered as compared with that of Comparative Example 6 with no substitution by Co, excluding that of Comparative Example 10 in which the amount of substitution by Co was 10%, whereas the high rate discharge performances of Examples 5 to 8 in which the amounts of substitution by Co were 0.5%, 1%, 1.5%, and 1.9% were not astonishingly lowered as compared with that of Comparative Example 6 (LiFePO$_4$).

That is, according to the invention, not only a polyanion-based active material having a large discharge capacity but also a positive active material also having excellent high rate discharge performance can be provided by adjusting the value of x in the general formula LiFe$_{(1-x)}$Co$_x$PO$_4$ to 0<x≦0.019, preferably the value of x 0.005 or higher and 0.019 or lower. From the results in Table 2, it can be understood that the high rate discharge performance was rather inversely improved in a case where the value of x was in a range of 0.005 or higher and 0.019 or lower and particularly, the high rate discharge performance was more improved in a case where the value of x was in a range of 0.010 or higher and 0.015 or lower.

Further, as it can be understood from Table 2, the cycle performances were all lowered in Comparative Examples 7 to 10 in which the amounts of substitution by Co were 2%, 3%, 5%, and 10% as compared with that of Comparative Example 6 ($LiFePO_4$), whereas the cycle performances were not astonishingly lowered in Examples 5 to 8 in which the amounts of substitution by Co were 0.5%, 1%, 1.5%, and 1.9% as compared with that of Comparative Example 6 ($LiFePO_4$).

That is, according to the invention, not only a polyanion-based active material having a large discharge capacity but also a positive active material also having excellent cycle performance can be provided by adjusting the value of x in the general formula $LiFe_{(1-x)}Co_xPO_4$ to $0<x\leq0.019$, preferably the value of x 0.005 or higher and 0.019 or lower. From the results in Table 2, it can be understood that the cycle performance was rather inversely improved in a case where the value of x was in a range of 0.005 or higher and 0.019 or lower and particularly, the cycle performance was more improved in a case where the value of x was in a range of 0.010 or higher and 0.015 or lower.

The action mechanism of exerting the remarkable effect to improve the discharge capacity as compared with that of $LiFePO_4$ and to provide a positive active material for a lithium secondary battery excellent in high rate discharge performance and also in cycle performance by adjusting the ratio of partial substitution by Co for Fe of $LiFePO_4$ to 0.019 or lower is not necessarily made clear; however the present inventors presume as follows. That is, the crystal of partially substituted by Co for Fe of $LiFePO_4$ form a solid solution. In this solid solution, the lattice constants of crystals become closer to the lattice constant of $LiCoPO_4$ according to the amount of substitution by Co. However, the phenomenon occurs in a case where the amount of substitution by Co is 2% or higher and if the amount of substitution by Co is less than 2%, the lattice constant is almost completely conformed to that of $LiFePO_4$. That is, the present inventors assume that due to the existence of Co with a small ion radius, although more slightly than that of Fe, while the same lattice volume being maintained, a certain effect such as widening of Li ion paths in the solid phase or the like is provided and therefore, the Li ions tend to transfer easily or the structural stability is improved. On the other hand, it is assumed that in a case where the amount of substitution by Co becomes 2% or higher, since the lattice constants are changed in accordance with the amount of substitution by Co, the above-mentioned special effect is lost, whereby various kinds of electrochemical performances of the active materials are deteriorated.

(High Temperature Storage Test)

Using the Positive Active Materials of Examples 6 and 8 and Comparative Examples 6, 9, and 10, lithium secondary batteries were assembled in the same manner as in Example 1 and according to the same procedure described above, "capacity retention ratio (%)" (high temperature storage stability) was evaluated. The results are shown in Table 3.

TABLE 3

| | Positive active material composition | Capacity retention ratio % |
|---|---|---|
| Comparative Example 6 | $LiFePO_4$ | 97.2 |
| Example 6 | $LiFe_{0.99}Co_{0.01}PO_4$ | 98.0 |
| Example 8 | $LiFe_{0.981}Co_{0.019}PO_4$ | 98.4 |
| Comparative Example 9 | $LiFe_{0.95}Co_{0.05}PO_4$ | 97.4 |
| Comparative Example 10 | $LiFe_{0.90}Co_{0.10}PO_4$ | 97.2 |

As it can be understood from Table 3, even in a case where the positive active material was conducted to carbon coating, the effect of the invention to provide a polyanion-based active material excellent in high temperature storage stability as compared with that of $LiFePO_4$ in Comparative Example 6 was confirmed by adjusting the value of x in the general formula $LiFe_{(1-x)}Co_xPO_4$ to $0<x\leq0.019$.

In the following examples and comparative examples, the invention will be described more in detail with respect to a battery including a positive electrode containing the positive active material of the invention and a negative electrode containing a carbon material (artificial graphite) in combination.

Example 9

(Production of $LiFe_{0.995}Co_{0.005}PO_4/C$)

First, after iron oxalate dihydrate ($FeC_2O_4 \cdot 2H_2O$), cobalt acetate tetrahydrate ($Co(CH_3COO)_2 \cdot 4H_2O$), ammonium dihydrogen phosphate ($NH_4H_2PO_4$), and lithium carbonate ($Li_2Co_3$) were weighed at a molar ratio of 0.995:0.005:1.00:0.51, these compounds were pulverized and mixed for 2 hours in nitrogen atmosphere by a ball mill using an alcohol as a solvent to obtain a precursor of $LiFe_{0.995}Co_{0.005}PO_4$. Next, the precursor of $LiFe_{0.995}Co_{0.005}PO_4$ was dried and transferred into a rotary kiln and while a gas mixture of evaporated methanol and nitrogen in an amount proper to give 2 mass % of carbon amount in $LiFe_{0.995}Co_{0.005}PO_4$ by thermal decomposition of methanol being supplied, the precursor was calcined on condition of 700° C. for 6 hours to produce lithium iron cobalt phosphate A with 0.5% substitution by Co ($LiFe_{0.995}Co_{0.005}PO_4/C$) of the invention. The rotation speed of the kiln was 1 r.p.m. The gas mixture of evaporated methanol and nitrogen was produced by sealing a methanol solution kept at 45° C. in a closed container and bubbling the solution using nitrogen as a carrier gas.

The carbon amount of lithium iron cobalt phosphate A ($LiFe_{0.995}Co_{0.005}PO_4/C$) was investigated by mass spectrometry. The composition of $LiFe_{0.995}Co_{0.005}PO_4$ was also confirmed by ICP emission spectroscopy.

(Production of Positive Electrode Plate)

Lithium iron cobalt phosphate A ($LiFe_{0.995}Co_{0.005}PO_4/C$) produced by the above-mentioned method was sufficiently mixed with acetylene black as a conductive agent and poly (vinylidene fluoride) (PVdF) as a binder at a mass ratio of 87:5:8 by using N-methyl-2-pyrrolidone (NMP) as a solvent to produce a positive electrode paste. The positive electrode paste was applied to both faces of an aluminum foil current collector with a thickness of 20 μm and pressed after drying to obtain a positive electrode plate.

(Production of Negative Electrode Plate)

Artificial graphite as a negative material (average particle size of 6 μm, lattice spacing d002 by X-ray diffractiometry of 0.337 nm, size of crystal in c-axis direction (Lc) of 55 nm) and PVdF as a binder were sufficiently mixed at a mass ratio of 94:6 by using N-methyl-2-pyrrolidone (NMP) as a solvent to produce a negative electrode paste. The negative electrode paste was applied to both faces of an copper foil current collector with a thickness of 10 μm and pressed after drying to obtain a negative electrode plate. A negative electrode terminal was welded to the negative electrode plate by resistance welding.

The positive electrode and the negative electrode were wound while sandwiching a separator, which is a continuously porous body with a thickness of 25 μm and an air permeability of 90 s/100 cc, between both electrodes and then put in a container with a height of 48 mm, a width of 30 mm, and a thickness of 5.2 mm. Further, a nonaqueous type liquid electrolyte (electrolyte solution) was poured into the inside of the container and the injection port was finally sealed to assemble lithium secondary battery A of the invention. The electrolyte solution to be used was a solution obtained by dissolving 1 mol/L of $LiPF_6$ in a solvent mixture of ethylene carbonate (EC), dimethyl carbonate (DMC), and ethyl methyl carbonate (EMC) at a volume ratio of 1:1:1. The designed capacity was 500 mAh.

Example 10

(Production of $LiFe_{0.99}Co_{0.01}PO_4/C$)

First, after iron oxalate dihydrate ($FeC_2O_4 \cdot 2H_2O$), cobalt acetate tetrahydrate ($Co(CH_3COO)_2 \cdot 4H_2O$), ammonium dihydrogen phosphate ($NH_4H_2PO_4$), and lithium carbonate ($Li_2Co_3$) were weighed at a molar ratio of 0.99:0.01:1.00:0.51, these compounds were pulverized and mixed for 2 hours in nitrogen atmosphere by a ball mill using an alcohol as a solvent to obtain a precursor of $LiFe_{0.99}Co_{0.01}PO_4$. Next, the precursor of $LiFe_{0.99}Co_{0.01}PO_4$ was dried and transferred into a rotary kiln and while a gas mixture of evaporated methanol and nitrogen in an amount proper to give 2 mass % of carbon amount in $LiFe_{0.99}Co_{0.01}PO_4$ by thermal decomposition of methanol being supplied, the precursor was calcined on condition of 700° C. for 6 hours to produce lithium iron cobalt phosphate B with 1% substitution by Co ($LiFe_{0.99}Co_{0.01}PO_4/C$) of the invention. The rotation speed of the kiln was 1 r.p.m. The gas mixture of evaporated methanol and nitrogen was produced by sealing a methanol solution kept at 45° C. in a closed container and bubbling the solution using nitrogen as a carrier gas.

The carbon amount of lithium iron cobalt phosphate B ($LiFe_{0.99}Co_{0.01}PO_4/C$) was investigated by organic elemental analyzer. The composition of $LiFe_{0.99}Co_{0.01}PO_4$ was also confirmed by ICP emission spectroscopy.

Lithium secondary battery B of the invention was assembled in the same manner as in Example 9, except that lithium iron cobalt phosphate B was used.

Example 11

(Production of $LiFe_{0.981}Co_{0.019}PO_4/C$)

First, after iron oxalate dihydrate ($FeC_2O_4 \cdot 2H_2O$), cobalt acetate tetrahydrate ($Co(CH_3COO)_2 \cdot 4H_2O$), ammonium dihydrogen phosphate ($NH_4H_2PO_4$), and lithium carbonate ($Li_2CO_3$) were weighed at a molar ratio of 0.981:0.019:1.00:0.51, these compounds were pulverized and mixed for 2 hours in nitrogen atmosphere by a ball mill using an alcohol as a solvent to obtain a precursor of $LiFe_{0.981}Co_{0.019}PO_4$. Next, the precursor of $LiFe_{0.981}Co_{0.019}PO_4$ was dried and transferred into a rotary kiln and while a gas mixture of evaporated methanol and nitrogen in an amount proper to give 2 mass % of carbon amount in $LiFe_{0.981}Co_{0.019}PO_4$ by thermal decomposition of methanol being supplied, the precursor was calcined on condition of 700° C. for 6 hours to produce lithium iron cobalt phosphate C with 1.9% substitution by Co ($LiFe_{0.981}Co_{0.019}PO_4/C$) of the invention. The rotation speed of the kiln was 1 r.p.m. The gas mixture of evaporated methanol and nitrogen was produced by sealing a methanol solution kept at 45° C. in a closed container and bubbling the solution using nitrogen as a carrier gas.

The carbon amount of lithium iron cobalt phosphate C ($LiFe_{0.981}Co_{0.019}PO_4/C$) was investigated by organic elemental analyzer. The composition of $LiFe_{0.981}Co_{0.019}PO_4$ was also confirmed by ICP emission spectroscopy.

Lithium secondary battery C of the invention was assembled in the same manner as in Example 9, except that lithium iron cobalt phosphate C was used.

Comparative Example 11

(Production of $LiFePO_4/C$)

First, after iron oxalate dihydrate ($FeC_2O_4 \cdot 2H_2O$), ammonium dihydrogen phosphate ($NH_4H_2PO_4$), and lithium carbonate ($Li_2CO_3$) were weighed at a molar ratio of 1.00:1.00:0.51, these compounds were pulverized and mixed for 2 hours in nitrogen atmosphere by a ball mill using an alcohol as a solvent to obtain a precursor of $LiFePO_4$. Next, the precursor of $LiFePO_4$ was dried and transferred into a rotary kiln and while a gas mixture of evaporated methanol and nitrogen in an amount proper to give 2 mass % of carbon amount in $LiFePO_4$ by thermal decomposition of methanol being supplied, the precursor was calcined on condition of 700° C. for 6 hours to produce lithium iron cobalt phosphate D with no substitution by Co ($LiFePO_4/C$). The rotation speed of the kiln was 1 r.p.m. The gas mixture of evaporated methanol and nitrogen was produced by sealing a methanol solution kept at 45° C. in a closed container and bubbling the solution using nitrogen as a carrier gas.

The carbon amount of lithium iron cobalt phosphate C ($LiFePO_4/C$) was investigated by organic elemental analyzer. The composition of $LiFePO_4$ was also confirmed by ICP emission spectroscopy.

Lithium secondary battery D of the invention was assembled in the same manner as in Example 9, except that lithium iron cobalt phosphate D was used.

Comparative Example 12

(Production of $LiFe_{0.98}Co_{0.02}PO_4/C$)

First, after iron oxalate dihydrate ($FeC_2O_4 \cdot 2H_2O$), cobalt acetate tetrahydrate ($Co(CH_3COO)_2 \cdot 4H_2O$), ammonium dihydrogen phosphate ($NH_4H_2PO_4$), and lithium carbonate ($Li_2CO_3$) were weighed at a molar ratio of 0.98:0.02:1.00:0.51, these compounds were pulverized and mixed for 2 hours in nitrogen atmosphere by a ball mill using an alcohol as a solvent to obtain a precursor of $LiFe_{0.98}Co_{0.02}PO_4$. Next, the precursor of $LiFe_{0.98}Co_{0.02}PO_4$ was dried and transferred into a rotary kiln and while a gas mixture of evaporated methanol and nitrogen in an amount proper to give 2 mass % of carbon amount in $LiFe_{0.98}Co_{0.02}PO_4$ by thermal decomposition of methanol being supplied, the precursor was calcined on condition of 700° C. for 6 hours to produce lithium iron cobalt phosphate E with 2% substitution by Co ($LiFe_{0.98}Co_{0.02}PO_4/C$) of the invention. The rotation speed of the kiln was 1 r.p.m. The gas mixture of evaporated methanol and nitrogen was produced by sealing a methanol solution kept at 45° C. in a closed container and bubbling the solution using nitrogen as a carrier gas.

The carbon amount of lithium iron cobalt phosphate E ($LiFe_{0.98}Co_{0.02}PO_4/C$) was investigated by organic elemental analyzer. The composition of $LiFe_{0.98}Co_{0.02}PO_4$ was also confirmed by ICP emission spectroscopy.

Lithium secondary battery E of the invention was assembled in the same manner as in Example 9, except that lithium iron cobalt phosphate E was used.

Comparative Example 13

(Production of LiFe$_{0.95}$Co$_{0.05}$PO$_4$/C)

First, after iron oxalate dihydrate (FeC$_2$O$_4$.2H$_2$O), cobalt acetate tetrahydrate (Co(CH$_3$COO)$_2$.4H$_2$O), ammonium dihydrogen phosphate (NH$_4$H$_2$PO$_4$), and lithium carbonate (Li$_2$CO$_3$) were weighed at a molar ratio of 0.95:0.05:1.00:0.51, these compounds were pulverized and mixed for 2 hours in nitrogen atmosphere by a ball mill using an alcohol as a solvent to obtain a precursor of LiFe$_{0.95}$Co$_{0.05}$PO$_4$. Next, the precursor of LiFe$_{0.95}$Co$_{0.05}$PO$_4$ was dried and transferred into a rotary kiln and while a gas mixture of evaporated methanol and nitrogen in an amount proper to give 2 mass % of carbon amount in LiFe$_{0.95}$Co$_{0.05}$PO$_4$ by thermal decomposition of methanol being supplied, the precursor was calcined on condition of 700° C. for 6 hours to produce lithium iron cobalt phosphate F with 5% substitution by Co (LiFe$_{0.95}$Co$_{0.05}$PO$_4$/C) of the invention. The rotation speed of the kiln was 1 r.p.m. The gas mixture of evaporated methanol and nitrogen was produced by sealing a methanol solution kept at 45° C. in a closed container and bubbling the solution using nitrogen as a carrier gas.

The carbon amount of lithium iron cobalt phosphate F (LiFe$_{0.95}$Co$_{0.05}$PO$_4$/C) was investigated by organic elemental analyzer. The composition of LiFe$_{0.95}$Co$_{0.05}$PO$_4$ was also confirmed by ICP emission spectroscopy. Lithium secondary battery E of the invention was assembled in the same manner as in Example 9, except that lithium iron cobalt phosphate F was used.

(High Temperature Storage Test)

The assembled lithium secondary batteries A to F were conducted to initial charge and discharge at 25° C. The initial charge was carried out by constant current and constant voltage charging at a constant current of 1 It (about 1 hour ratio, 500 mA) to 3.6 V and further at a constant voltage of 3.6 V in total 3 hours. Successively, the initial discharge was carried out by constant current discharging at a constant current of 1 It (about 1 hour ratio, 500 mA) to 2.0 V and the discharge capacity at this time was recorded as "initial discharge capacity (mAh)". Successively, after constant current and constant voltage charge was carried out at 25° C. by charging at a constant current of 1 It (about 1 hour ratio, 500 mA) to 3.6 V and further at a constant voltage of 3.6 V in total 3 hours, the batteries were stored at 60° C. for 10 days. Thereafter, constant current discharge was carried out at 25° C. by discharging at a constant current of 1 It (about 1 hour ratio, 500 mA) to 2.0 V and the discharge capacity at this time was recorded as "remaining discharge capacity (mAh)". Successively, one cycle charge and discharge was carried out at 25° C. The charge was carried out by constant current and constant voltage charging at a constant current of 1 It (about 1 hour ratio, 500 mA) to 3.6 V and further at a constant voltage of 3.6 V in total 3 hours. Successive discharge was carried out by constant current discharging at a constant current of 1 It (about 1 hour ratio, 500 mA) to 2.0 V and the discharge capacity at this time was recorded as "recovery discharge capacity (mAh)". The percentage of the "remaining discharge capacity (mAh)" to the "initial discharge capacity (mAh)" was calculated as "remaining capacity ratio (%)". The results are shown in Table 4 and FIG. 2. Further, the percentage of the "recovery discharge capacity (mAh)" to the "initial discharge capacity (mAh)" was calculated as "recovery capacity ratio (%)". The results are shown in Table 5 and FIG. 3.

TABLE 4

| Battery | Value of X in LiFe$_{(1-x)}$Co$_x$PO$_4$ | Initial discharge capacity (mAh) | Remaining discharge capacity (mAh) | Remaining capacity ratio (%) |
|---|---|---|---|---|
| D | 0 | 411.0 | 295.9 | 72.0 |
| A | 0.005 | 411.2 | 316.6 | 77.0 |
| B | 0.01 | 411.5 | 358.2 | 87.0 |
| C | 0.019 | 421.5 | 358.3 | 85.0 |
| E | 0.02 | 421.2 | 355.1 | 84.3 |
| F | 0.05 | 399.9 | 318.6 | 79.7 |

TABLE 5

| Battery | Value of X in LiFe$_{(1-x)}$Co$_x$PO$_4$ | Initial discharge capacity (mAh) | Recovery discharge capacity (mAh) | Recovery capacity ratio (%) |
|---|---|---|---|---|
| D | 0 | 411.0 | 324.8 | 79.0 |
| A | 0.005 | 411.2 | 350.8 | 85.3 |
| B | 0.01 | 411.5 | 376.2 | 91.4 |
| C | 0.019 | 421.5 | 378.1 | 89.7 |
| E | 0.02 | 421.2 | 374.7 | 89.0 |
| F | 0.05 | 399.9 | 343.3 | 85.8 |

From Table 4, it can be understood that the remaining capacity ratios of lithium secondary batteries A, B, and C of the invention are higher than that of lithium secondary battery D. It can also be understood that the remaining capacity ratio of battery C with x=0.019 is higher than those of batteries E and F with x≧0.02.

From Table 5, it can be understood that the recovery capacity ratios of lithium secondary batteries A, B, and C of the invention are higher than that of lithium secondary battery D. It can also be understood that the recovery capacity ratio of battery C with x=0.019 is higher than those of batteries E and F with x≧0.02.

From these results, it can be understood that the battery performances, namely, the remaining capacity ratios or recovery capacity ratios, after storage of batteries using a carbon material capable of insertion and extraction a lithium ion for the negative electrode can be heightened by selecting 0<x≦0.019 for the value of x in LiFe$_{(1-x)}$Co$_x$PO$_4$. Further, it can be also understood that the value of x is preferably around 0.01.

Figure 2:
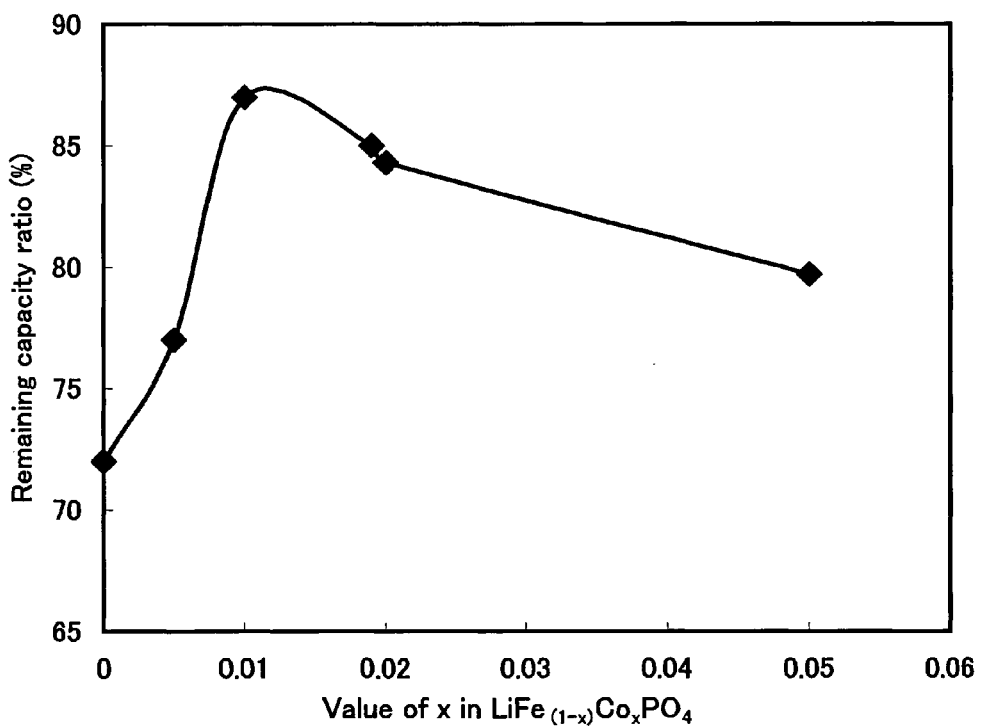
FIG. 2: A drawing for comparison of the remaining discharge capacity of the batteries of examples and the batteries of comparative examples.
Figure 3:
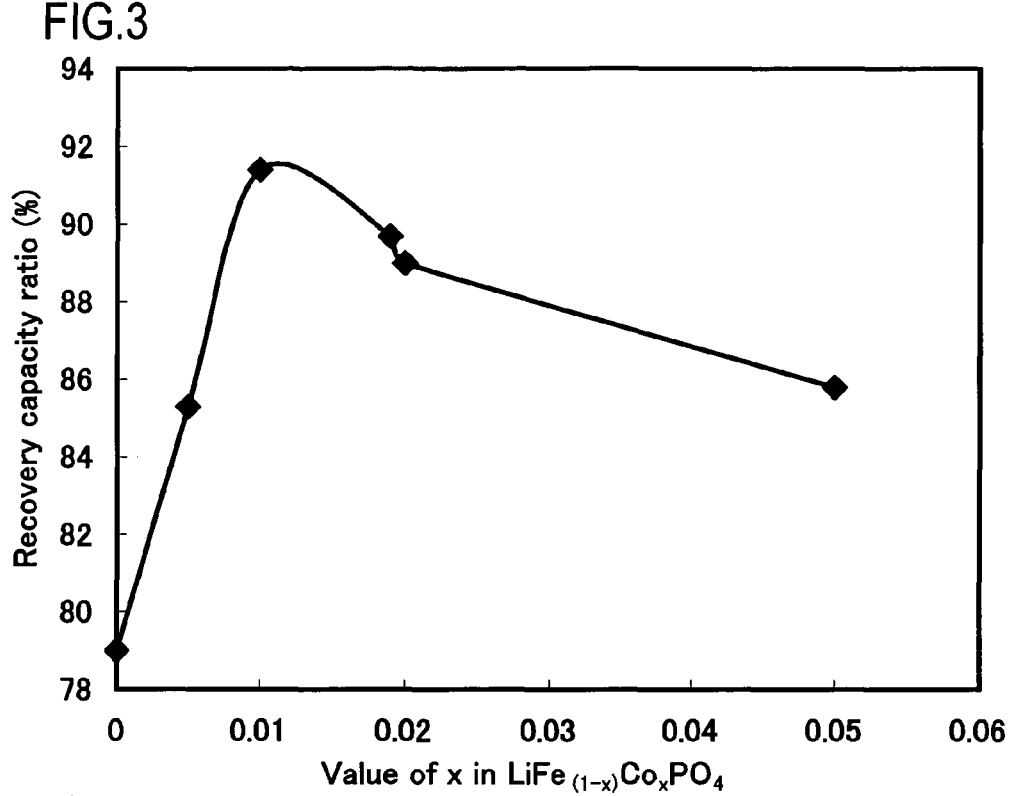
FIG. 3: A drawing for comparison of the recovery discharge capacity of the batteries of examples and the batteries of comparative examples.

As described above, any of the conventionally known documents contains no concrete description of batteries using a positive active material of partially substituted by Co for Fe of LiFePO$_4$ and a carbon material for a negative electrode; however even if the storage performances of batteries using a positive active material of partially substituted by Co for Fe of LiFePO$_4$ and a carbon material for a negative electrode was known, the invention which shows outstanding tendency as shown in FIGS. 2 and 3 in terms of the remaining capacity ratio or the recovery capacity ratio with the value of x as the Co replacement in a range exceeding 0 to not higher than 0.019 can not be easily made.

The capacity balance of the battery of the invention is designed by limiting the negative electrode and the capacity balance based on the limiting of the negative electrode is not changed even if the cycle test and the storage test is carried out and the "remaining capacity ratio" and the "recovery capacity ratio" measured in examples are evaluation of the Li-retention capability in the negative electrode side in the storage test. Accordingly, it is apparent that the difference of the Co content in the positive active material affects the Li-retention capability in the negative electrode side. The fact that such an action effect would be exerted is not at all expected even by the present inventors and the action mechanism is not yet made apparent now. One assumption of the present inventors is that Fe could be eluted from the positive electrode side in a case where $LiFePO_4$ is used for the positive electrode and would cause a certain adverse effect on the negative electrode and on the other hand, Co could be eluted and reach the negative electrode and the above-mentioned adverse effect by Fe on the negative electrode could be moderated and as a result, the coating formation on the carbon negative electrode could be optimized to improve the Li retention capability in the case of using partially substituted by Co for Fe of $LiFePO_4$ for the positive electrode.

(Charge and Discharge Cycle Test)

The assembled lithium secondary batteries A to F were conducted to a charge and discharge test. The initial charge-discharge was carried out in the same process as that of the storage test. Successively, 50 cycles of a cycle test was carried out at 45° C. The charge was carried out by constant current and constant voltage charging at a constant current of 1 It (about 1 hour ratio, 500 mA) to 3.6 V and further at a constant voltage of 3.6 V in total 3 hours. Successively, the discharge was carried out by constant current discharging at a constant current of 1 It (about 1 hour ratio, 500 mA) to 2.0 V. Thereafter, the cycle test was carried out again at 25° C. The charge was carried out by constant current and constant voltage charging at a constant current of 1 It (about 1 hour ratio, 500 mA) to 3.6 V and further at a constant voltage of 3.6 V in total 3 hours. Successively, the discharge was carried out by constant current discharging at a constant current of 1 It (about 1 hour ratio, 500 mA) to 2.0 V and the discharge capacity was recorded as "discharge capacity after 50 cycles (mAh)". The percentage of the "discharge capacity after 50 cycles (mAh)" to the "initial discharge capacity (mAh)" was calculated as "charge and discharge cycle performance (%)". The results are shown in Table 6 and FIG. 4.

TABLE 6

| Battery | Value of X in $LiFe_{(1-x)}Co_xPO_4$ | Initial discharge capacity (mAh) | Discharge capacity after 50 cycles (mAh) | Charge and discharge cycle performance (%) |
| --- | --- | --- | --- | --- |
| D | 0 | 406.2 | 383.7 | 94.5 |
| A | 0.005 | 409.3 | 402.1 | 98.2 |
| B | 0.01 | 411.8 | 410.7 | 99.7 |
| C | 0.019 | 422.1 | 416.2 | 98.6 |
| E | 0.02 | 420.9 | 414.4 | 98.5 |
| F | 0.05 | 398.5 | 385.7 | 96.8 |

Figure 4:
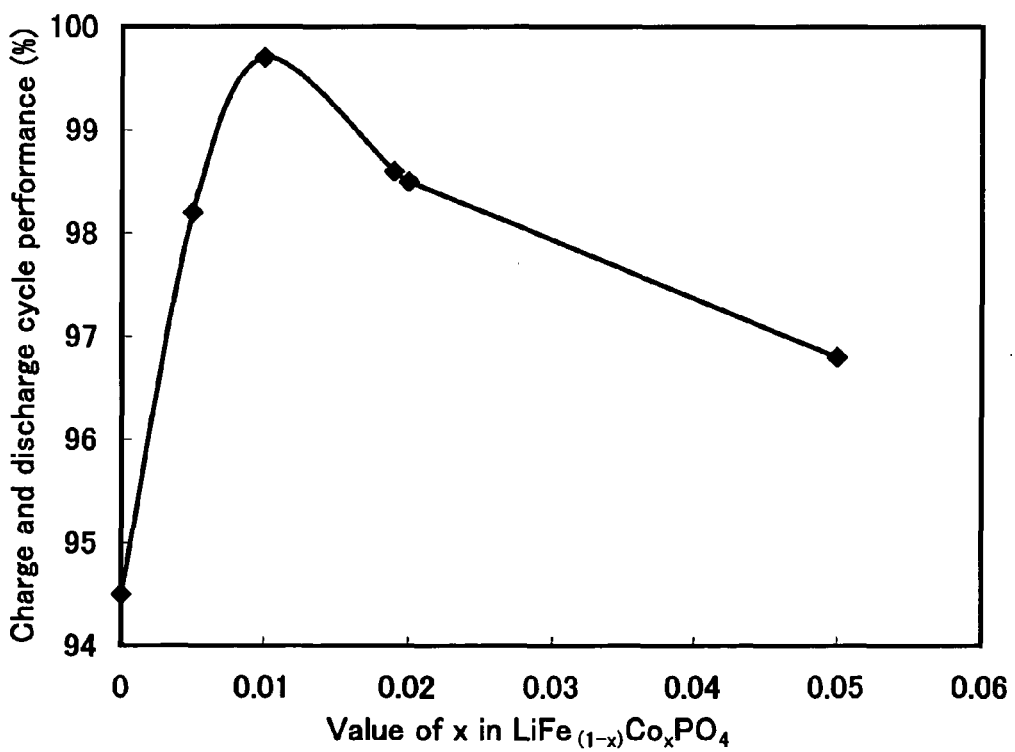
FIG. 4: A drawing for comparison of the cycle performance of the batteries of examples and the batteries of comparative examples.

From Table 6 and FIG. 4, it can be understood that the cycle performances of lithium secondary batteries A, B, and C of the invention are higher than that of lithium secondary battery D. It can be understood that the cycle performance of battery C with x=0.019 is higher than those of the batteries E and F with x≧0.02.

From these results, it can be understood that the cycle performances of batteries using a carbon material capable of insertion and extraction a lithium ion for the negative electrode could be heightened by selecting 0<x≦0.019 for the value of x in $LiFe_{(1-x)}Co_xPO_4$. Further, it can be also understood that the value of x is preferably around 0.005 or higher.

As described above, any of the conventionally known documents contains no concrete description of batteries using a positive active material of partially substituted by Co for Fe of $LiFePO_4$ and a carbon material for a negative electrode; however even if the cycle performances of batteries using a positive active material of partially substituted by Co for Fe of $LiFePO_4$ and a carbon material for a negative electrode was known, the invention which shows outstanding tendency as shown in FIG. 4 in terms of the cycle performance with the value of x as the Co replacement in a range exceeding 0 to not higher than 0.019 can not be easily made.

The positive active materials for a lithium secondary battery produced in all of examples and comparative examples were condected to powder X-ray diffraction measurement by using CuKα radiation to find the formation of a single phase and no peak corresponding to $Fe_2P$ impurity phase around 41° and therefore, existence of the $Fe_2P$ impurity phase as described in Non-patent Document 3 was not confirmed.

Although the causes for that the results of the tests carried out by the present inventors are significantly different from the results of decrease of the initial discharge capacity and low capacity at the time of cycles by replacing a portion of $LiFePO_4$ with CO described in Non-patent Document 3 are not yet made clear, it is supposedly attributed to no $Fe_2P$ impurity phase existence in the positive active material, difference of reaching of the positive electrode voltages at the time of charging, and cells using a carbon material but not cells using lithium metal for the negative electrode or a single pole cell.

The fact that such an effect would be exerted is not at all expected even by the present inventors and the action mechanism is not yet made apparent at the moment. One assumption of the present inventors is that Fe could be eluted from the positive electrode side in a case where $LiFePO_4$ is used for the positive electrode and would cause a certain adverse effect on the negative electrode and on the other hand, Co could be eluted and reach the negative electrode and the above-mentioned adverse effect by Fe on the negative electrode could be moderated and as a result, the increase of an irreversible capacity in the negative electrode along with the cycle test could be suppressed in the case of using partially substituted by Co for Fe of $LiFePO_4$ for the positive electrode.

Industrial Applicability

According to the invention, since a lithium secondary battery excellent in high temperature storage stability and cycle performance can be provided by using a thermally stable polyanion-based positive active material, it is suitable for applications in fields in which long lives, high capacities, and high output powers are required, for example, electric automobiles and industrial batteries highly expected in future and the industrial applicability of the invention is outstanding.

FIG. 1
1 Comparative Example 5
2 Example 2
FIG. 2
3 Remaining capacity ratio (%)
4 Value of x in $LiFe_{(1-x)}Co_xPO_4$
FIG. 3
5 Recovery capacity ratio (%)
6 Value of x in $LiFe_{(1-x)}Co_xPO_4$
FIG. 4
7 Charge and discharge cycle performance (%)

The invention claimed is:

1. A positive active material for a lithium secondary battery comprising lithium iron cobalt phosphate represented by the general formula: $Li_yFe_{(1-x)}Co_xPO_4$ (0<x≦0.019, 0≦y≦1.2).

2. The positive active material for a lithium secondary battery according to claim 1, wherein the reference character x satisfies 0.005≦x≦0.019.

3. A lithium secondary battery comprising a positive electrode comprising the positive active material according to claim 1 or 2, a negative electrode, and a nonaqueous electrolyte.

4. The lithium secondary battery according to claim 3, wherein the negative electrode comprises a carbon material capable of insertion and extraction a lithium ion.

* * * * *